US007424315B2

(12) United States Patent
Heuts et al.

(10) Patent No.: US 7,424,315 B2
(45) Date of Patent: Sep. 9, 2008

(54) COMMUNICATION BUS SYSTEM OPERABLE IN A SLEEP MODE AND A NORMAL MODE

(75) Inventors: Patrick Willem Hubert Heuts, Nijmegen (NL); Hendrik Boezen, Nijmegen (NL); Harm Gerwin Joan Voss, Nijmegen (NL); Stefan Gerhard Erich Butselaar, Nijmegen (NL)

(73) Assignee: NXP B.V., Eindhoven (NL)

( * ) Notice: Subject to any disclaimer, the term of this patent is extended or adjusted under 35 U.S.C. 154(b) by 634 days.

(21) Appl. No.: 10/499,401

(22) PCT Filed: Dec. 10, 2002

(86) PCT No.: PCT/IB02/05330

§ 371 (c)(1), (2), (4) Date: Jun. 17, 2004

(87) PCT Pub. No.: WO03/054673

PCT Pub. Date: Jul. 3, 2003

(65) Prior Publication Data

US 2005/0025084 A1 Feb. 3, 2005

(30) Foreign Application Priority Data

Dec. 21, 2001 (EP) ................................. 01205134

(51) Int. Cl.

*H04B 1/38* (2006.01)
*H04B 7/00* (2006.01)
*H04B 1/16* (2006.01)
*H04B 1/04* (2006.01)
*H04B 3/36* (2006.01)
*G08C 17/00* (2006.01)

(52) U.S. Cl. ....................... 455/574; 455/573; 455/522; 455/343.1; 455/127.1; 370/311; 375/211

(58) Field of Classification Search ................. 370/315, 370/311; 455/127.1, 574, 343.1–343.6, 522, 455/572, 573; 375/211, 212
See application file for complete search history.

(56) References Cited

U.S. PATENT DOCUMENTS 4,989,261 A * 1/1991 Lee ......................... 455/127.1
5,428,252 A * 6/1995 Walker et al. ................. 307/64
5,838,720 A * 11/1998 Morelli ....................... 375/219

(Continued)

*Primary Examiner*—George Eng
*Assistant Examiner*—Christopher M Brandt
(74) *Attorney, Agent, or Firm*—Peter Zawilski

(57) ABSTRACT

The communication bus system comprises a plurality of node circuits (10*a-d*) and a relay circuit (12, 14, 16) coupling the node circuits (10*a-d*). The relay circuit (12, 14, 16) has a transceiver circuit (124, 164) for relaying messages (21) between the node circuits (10*a-d*) in a normal mode. The transceiver circuit (124, 164) is powered down in a sleep mode. A detector circuit (120, 160) detects an incoming message (41) when the relay circuit (12, 14, 16) is in a sleep mode. A mode control circuit (122, 162) powers up the transceiver (124, 164) in response to detection of an incoming message (21). Steps are taken that ensure, in the normal mode, that messages (21) will not be relayed in unreadable form. The mode control circuit (122, 162) is arranged to cause the transceiver (124, 164) to relay a remainder (25) of the incoming message (21) after power up. In an embodiment the power needed to transmit the remainder (25) of the message (21) is drained from a capacitor (306) in the power supply (30) before the power supply (30) controls the power supply voltage in the normal mode. In another embodiment the detector circuit (120, 160) temporarily controls the direction of operation of the transceivers (124, 164) at the start of the normal mode instead of further detectors (58*a-d*) that normally control the direction of operation in the normal mode.

11 Claims, 4 Drawing Sheets

U.S. PATENT DOCUMENTS

| | | | | |
|---|---|---|---|---|
| 5,862,493 | A * | 1/1999 | Barkat et al. | 455/572 |
| 6,098,100 | A * | 8/2000 | Wey et al. | 709/223 |
| 6,185,190 | B1 * | 2/2001 | Jin et al. | 370/246 |
| 6,363,146 | B1 * | 3/2002 | Aranovich et al. | 379/422 |
| 6,463,543 | B1 * | 10/2002 | Alvarez | 713/323 |
| 2001/0010491 | A1 * | 8/2001 | Marneweck et al. | 340/10.33 |
| 2002/0081991 | A1 * | 6/2002 | Eichin et al. | 455/343 |
| 2003/0099210 | A1 * | 5/2003 | O'Toole et al. | 370/311 |

* cited by examiner 22
23

28
29

COMMUNICATION BUS SYSTEM OPERABLE IN A SLEEP MODE AND A NORMAL MODE

The invention relates to a communication bus system.

Communication bus systems are a well known solution for providing shared communication lines for communication between different pairs of node circuits. One way of sharing the communication lines is, for example, to assign different time slots to different node circuits, so that each node circuit can transmit messages in its own time slots without conflicts with other node circuits.

PCT patent application No. 99/46888 describes a bus system that switches to a sleep mode in which the power consumption of the system is lower than in the normal operation mode. Often, none of the node circuits will transmit messages for a considerable period of time. This may be exploited to reduce the power consumption of the system. To do so the system switches to a sleep mode during such periods. In the sleep mode a major part of each node circuit is powered off, except for a small detection circuit. The detection serves to monitor whether there is activity on the communication lines and, if so, to trigger the node circuit to switch back to the normal mode in which the node circuit is powered up. In order to minimize the power consumed, the detection circuit has a minimum of functionality, preferably merely the ability to detect messages and to trigger wake-up. To minimize power consumption, no transmission capability, arbitration or even any message receiving capability is preferably provided in the sleep mode.

Of course, the response speed of the system is reduced in the sleep mode, because the system has to "wake up" first by switching from the sleep mode to the normal mode before it can transmit messages. First of all, a power supply, such as a switched mode power supply that operates at a rate of typically 100 kHz, needs scores of microseconds to become fully operational, that is much longer than the typical message length of 10 microseconds. In order to prevent unpredictable behavior the circuits that start receiving power again first have to be brought into a power-up or reset state before they can start operating. Subsequently, it may be necessary to perform initialization procedures.

In decentralized bus systems this speed reduction is even larger when the bus structure is segmented into sections with relay node circuits between the sections. In such a decentralized system wake-up messages have to travel between node circuits and relay circuits to wake up the system (the wake-up messages may be special wake-up messages or normal messages that have a meaning in the normal mode as well).

However, when a relay circuit first receives such a wake-up message, it is still in the sleep mode so that is unable to relay the wake-up message. It takes a long time before transmission of the wake-up message can be retried.

An extreme example of the speed reduction that may be caused by such a delay occurs in a bus with a tired star topology. In a tired star topology any message has to be relayed, possibly over a relay path via a series of relay circuits, in order to reach a communication line whereto the receiving node circuit is connected. Thus, when one message is used to wake up a relay circuit and a retry message is used to wake up the next relay circuit, an additional retry message is needed for each relay circuit along the path. This leads to considerable delays.

It is inter alia an object of the invention to provide for a segmented communication bus system with a sleep mode, which system is able to wake up faster from the sleep mode when a node circuit starts transmitting messages.

The communication bus system according to the invention is set forth in claim 1. According to the invention a relay circuit that is woken up by a message is arranged to drop into relay transmission of a remainder of that message that is in progress when the transceiver of the relay circuit powers up. Measures that ensure, in the normal mode, that messages are relayed in readable form are set aside. Of course, this will mean that the relayed message may be damaged, at least since it lacks the initial part of the original message before the transceivers are powered up. However, this will not lead to problems because the first relayed message only serves to trigger wake-up, prior to retry of transmission of the message. Only a retry of the message will be interpreted, but by the time that the retry is sent all of the relay path, or at least more than one relay circuit, will have woken up due to the original message.

An embodiment of the system according to the invention is set forth in claim 2. In this embodiment the relay circuit uses a power supply with a charge-up capacitor to supply power to the transceiver of the relay circuit and the detector. The rate at which the charge-up capacitor is charged varies with the mode. In the normal mode a frequency of 100 kHz of recharge pulses may be used, for example, and a much lower frequency may be used in the sleep mode.

In the sleep mode the power consumption from the power supply by the transceiver is interrupted. Upon switching back to the normal mode, the transceiver is allowed to perform transmission of the remainder of the message at least partly using energy from the charge-up capacitor before the power supply is charging it at the normal rate. Of course, this situation would not be acceptable in the normal mode, or the charge-up capacitor would be completely discharged by the transceiver, but it allows at least a part of the wake-up message to be passed almost immediately. This allows as many as possible relay circuits and/or node circuits to be woken up at the time of the first wake-up message.

A further embodiment of the circuit according to the invention is set forth in claim 3. In this embodiment the supply of power to the relay circuit is phased. In a first phase, when the power supply is not yet operating normally, power supply is withheld from further circuits that do not include the transceivers. These further circuits receive power only when the power supply has returned to normal operation. More power is thus available from the charge-up capacitor for the transceiver to transmit the remainder of the incoming message.

Another embodiment of the circuit according to the invention is set forth in claim 5. In this embodiment a configuration circuit configures the transceiver to transmit to certain outputs information received from a selected one of the inputs, dependent on the input on which information is received. On switch-over from the sleep mode to the normal mode, the detector circuit that triggers the switch-over is used to select the configuration. Thus, after switching to the normal mode, no additional time is lost on detection of the required input. This makes it possible to pass more of the remainder of the incoming message and thereby to wake up more relay circuits and nodes.

In a further embodiment an additional detection circuit is used to control the configuration in the normal mode, and this other detection circuit is switched on only in the normal mode when the power supply operates normally. Thus, the additional detection circuit can consume more power than the detection circuit used in the sleep mode, allowing a faster detection and thereby faster operation, without increasing power consumption in the sleep mode or marring the transceivers by draining the charge-up capacitor when the transceivers relay the incoming message before the power supply operates normally. In the embodiment where selection of the transceiver configuration is controlled by the sleep mode detection circuit on switch-over from the sleep mode, the fact that the additional detection circuit only starts operating after switching to the normal mode does not even cause a delay in selection of the transceiver configuration.

These and other objects and advantages of the communication bus system and relay circuit according to the invention will be described in more detail, by way of example, with reference to the following figures. Therein:

Figure 1:
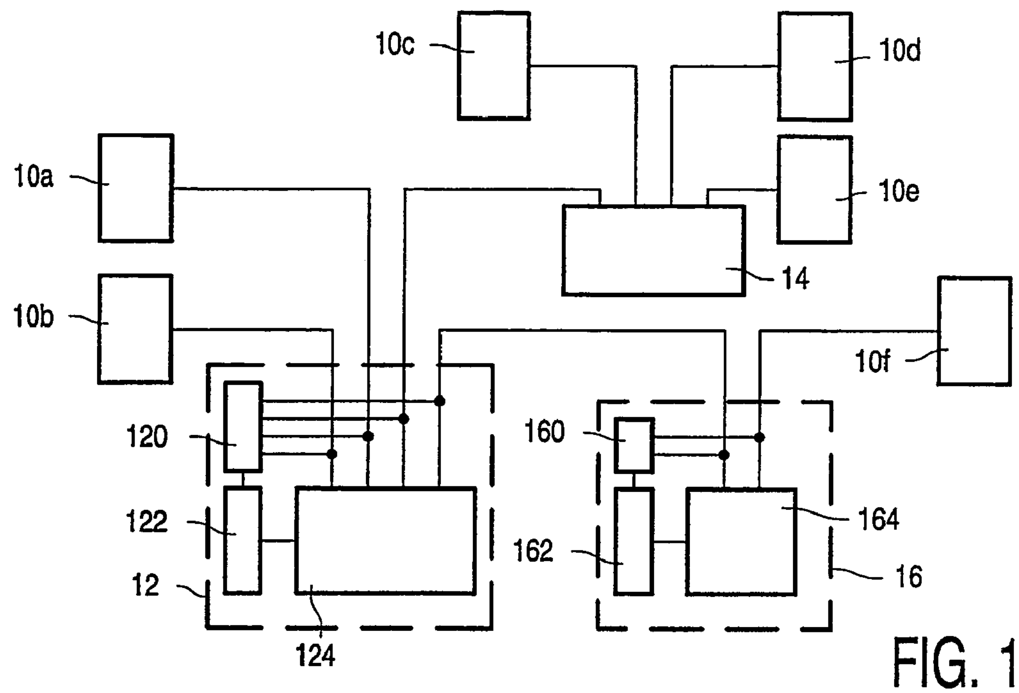
FIG. 1 shows a communication bus system.

FIG. 1 shows a communication bus system. The system contains a number of node circuits 10*a-f* coupled by relay circuits 12, 14, 16. A first and a second relay circuit 12, 14 are similar and have four input/outputs for connection to node circuits 10*a-f* and/or to other relay circuits 12, 14, 16. A third relay circuit 16 has two input outputs. The lines connecting the node circuits 10*a-f* and the relay circuits 12, 14, 16 may be electrical conductors or fiber optic connections. Although single lines are shown to connect the node circuits 10*a-f* and the relay circuits 12, 14, 16, it will be understood that in practice more than one line may be used, such as, for example, a pair of electrical conductors for conducting differential voltages or currents.

More specifically the first and the third relay circuit 12, 16 are shown to include a detector circuit 120, 160, a mode control circuit 122, 162 and a transceiver circuit 124, 164. The transceiver circuit 124 of a relay circuit 12, 16 has input/outputs coupled to the mode circuit 10*a-f* and other relay circuits 12, 14, 16. The detector circuit 120, 160 has inputs coupled to the input/outputs of the transceiver circuit 124, 164 and an output coupled to the mode control circuit 122, 162. The mode control circuit 122, 162 has an output coupled to the transceiver circuit 124, 164.

In operation the relay circuits 12, 14, 16 can operate in a normal mode and a sleep mode. In the normal mode the transceiver circuit 124, 164 of the relay circuit 12, 14, 16 receives messages from the node circuits 10*a-f* and relays these messages to other node circuits 10*a-f*. The lines connecting the node circuits 10*a-f* and the relay circuits 12, 14, 16 support message transmission in two directions. The transceiver 124, 164 detects on which of its input/outputs a message arrives and configures itself so that the message is relayed from that input/output to the other input/output.

The mode control circuit 122, 162 switches its relay circuit 12, 14, 16 from the normal mode to the sleep mode when the relay circuit 12, 14, 16 does not receive any messages during a predetermined time interval. In the sleep mode, large parts of the relay circuits stop consuming power, for example, to save a battery (not shown) that supplies power to the relay circuit. In particular, the transceiver circuit 124, 164 no longer consumes the power needed to retransmit messages via its input/outputs or to be ready to do so.

The detector circuit 120, 160 serves to trigger a switch back from the sleep mode to the normal mode. The detector circuit 120, 160 receives power in the sleep mode and detects whether any message arrives while the relay circuit 12, 14, 16 is in the sleep mode. If so, the detector circuit 120, 160 sends a trigger signal to the mode control circuit 122, 162. In response the mode control circuit 122, 162 switches back the relay circuit 12, 14, 16 to the normal mode.

Figure 2:
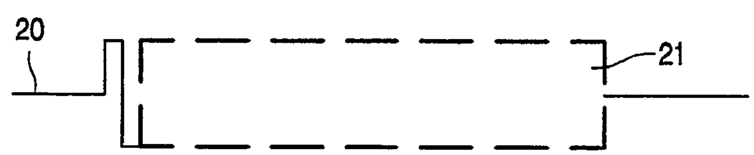
FIG. 2 shows signals used in a relay circuit.
Figure 2:
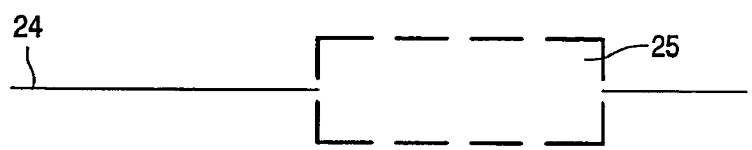
Figure 2:
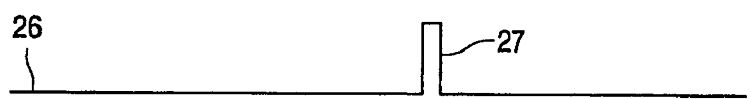

FIG. 2 shows signals occurring in a relay circuit 12, 14, 16 during the switch-over from the sleep mode to the normal mode. A first signal 20 shows a signal arriving at one of the input/outputs of the transceiver 124, 164. By way of example there is shown a differential signal 20 that is a potential difference between the potentials of a pair of conductors, represented by a signal line, that connects the relay circuit 12, 14, 16 to one of the node circuits 10*a-f* or another relay circuit 12, 14, 16. Prior to a message 21 the potential difference is zero, but during the message 21 the potential difference switches back and forth between positive and negative levels.

A second signal 22 is a trigger signal produced by the detector circuit 120, 160. The detector circuit 120, 160 detects the message 21, for example, on the basis of the occurrence of potential differences above a certain threshold level, and generates a pulse 23, inevitably with some delay after the start of the message 21. In response to the pulse 23, the mode control circuit 122, 162 switches back the relay circuit 12, 14, 16 to the normal mode, and in particular it causes the transceiver circuit 124, 164 to start consuming power for transmitting. According to the invention the transceiver circuit 124, 164 uses the power to transmit a remainder of the message that caused the trigger pulse 23 via its other input/outputs.

A third signal 24 comprises the remainder 25 of the message transmitted by the transceiver 124, 164 on its other input/outputs. This message may be transmitted to a node circuit 10*a-f* or to another relay circuit 12, 14, 16. Because of the late start, the message may be damaged to an extent that it is useless for communicating the message content. However, according to the invention the message is transmitted anyway in order to cause other circuits to switch from the sleep mode to the normal mode.

A fourth signal 26 and a fifth signal 28 comprise a further trigger pulse 27, generated by a detection circuit 120, 160 in a further relay circuit 12, 14, 16 in response to the remainder 25 of the message, and a further remainder 29 transmitted by the further relay circuit 12, 14, 16 in response to the further trigger pulse 27.

It is to be noted that the further remainder 29 is even shorter than the remainder 25. This is a result of delays in the relay circuits 12, 14, 16. To switch as much of the system from the sleep mode to the normal mode, it is desirable that the delays are as short as possible, even if they are so long that they cause so much damage to the message 21 that the message 21 is useless for communicating information encoded in the message 21. In order to minimize the delay, the relay circuit 12, 14, 16 sets aside measures for ensuring that useful messages are transmitted.

Figure 3:
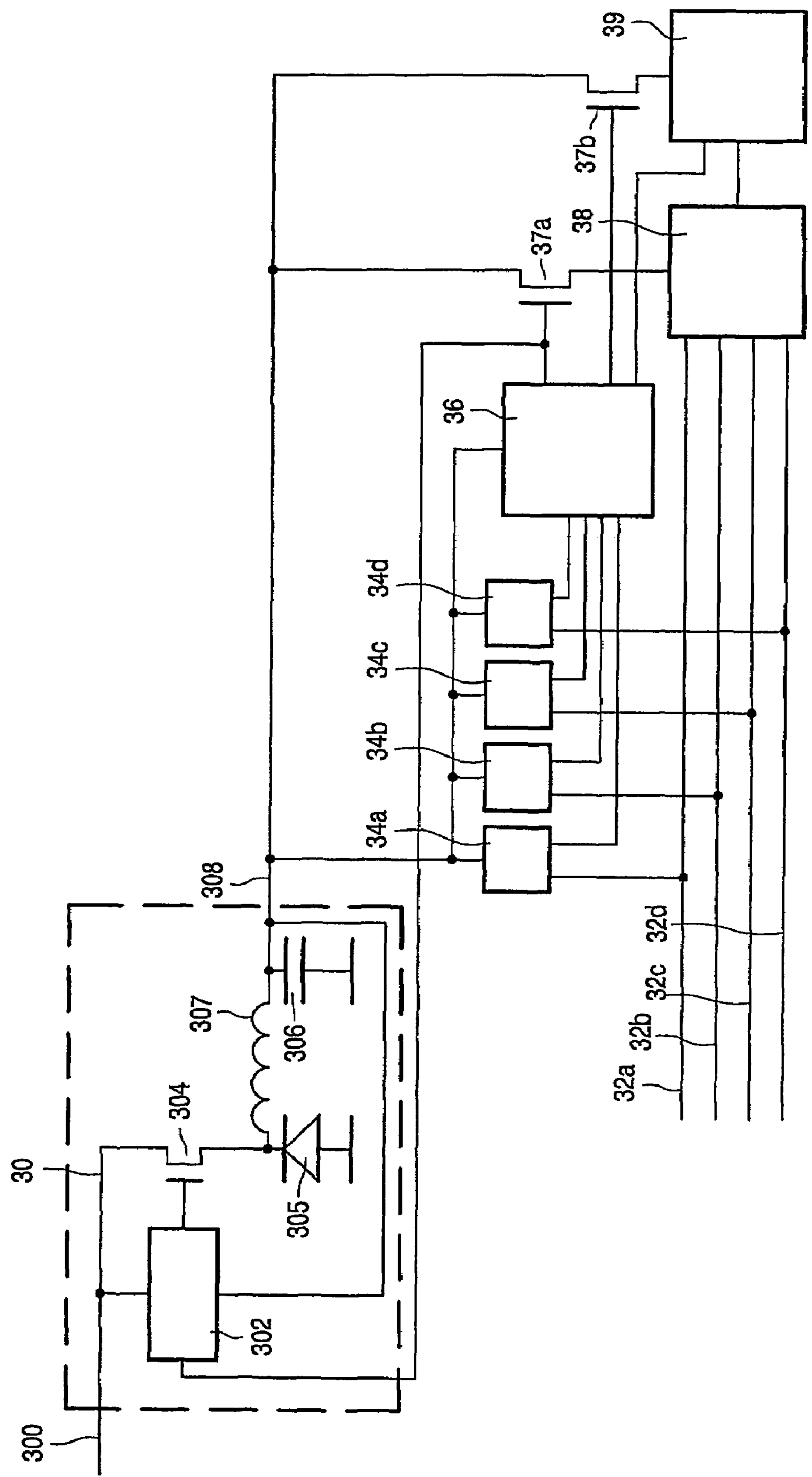
FIG. 3 shows a relay circuit.

FIG. 3 shows an embodiment of a relay circuit in more detail. A relay circuit with four input/outputs is shown by way of example, but any number of input/outputs may be used. The relay circuit has input/outputs 32*a-d* and includes a power supply circuit 30, detection circuits 34*a-d*, a mode control circuit 36, a transceiver circuit 38 and further circuits 39 (including, for example, a microcontroller).

The power supply circuit 30 has an input 300 coupled to an external power supply terminal such as a terminal of a battery (not shown) and an output 308. The output 308 is coupled directly to the detection circuits 34*a-d* and the mode control circuit 36. The output 308 is coupled to the transceiver 38 and the further circuits 39 via a first and second switch 37*a,b*, respectively. The switches 37*a,b* are controlled by the mode control circuit 36. Input/outputs 32*a-d* are coupled to the transceiver 38 and to respective detection circuits 34*a-d*. The detectors are coupled to the mode control circuit 36. The mode control circuit 36 has a reset output coupled to the further circuits 39.

The power supply circuit 30 contains a regulator circuit 302, a switch 304, a diode 305, a charge-up capacitor 306 and an inductor 307. The output 308 is coupled to the charge-up capacitor 306, so that the voltage across the charge-up capacitor 306 constitutes the supply voltage of the further circuits. The input 300 is coupled to the charge-up capacitor 306 via the switch 304 and the inductor 307. A node between the switch 304 and the inductor 307 is coupled to ground via the diode 305. The regulator circuit 302 controls the switch 304 in dependence on the voltage across the charge-up capacitor 306. The regulator circuit 302 has a mode control input coupled to the mode control circuit 36. Preferably, all components of the circuit of FIG. 3, except the inductor 307 and the capacitor 306, are taken up in a single integrated circuit. The inductor 307 and the capacitor 306 are connected to the integrated circuit via external pins of this circuit.

The circuit can operate in the normal mode and the sleep mode. In the normal mode, the mode control circuit makes the first and the second switch 37*a,b* conductive, supplying power from the charge-up capacitor 306 to the transceiver 38 and the further circuits 39. In the sleep mode, the mode control circuit makes the first and the second switch 37*a,b* non-conductive, so that the transceiver 38 and the further circuits 39 receive no power supply.

In the sleep mode the detection circuits 34*a-d* also detect whether any messages arrive at the input/outputs 32*a-d*. If so, the detection circuits 34*a-d* trigger the mode control circuit 36 to switch the relay circuit to the normal mode.

Figure 4:
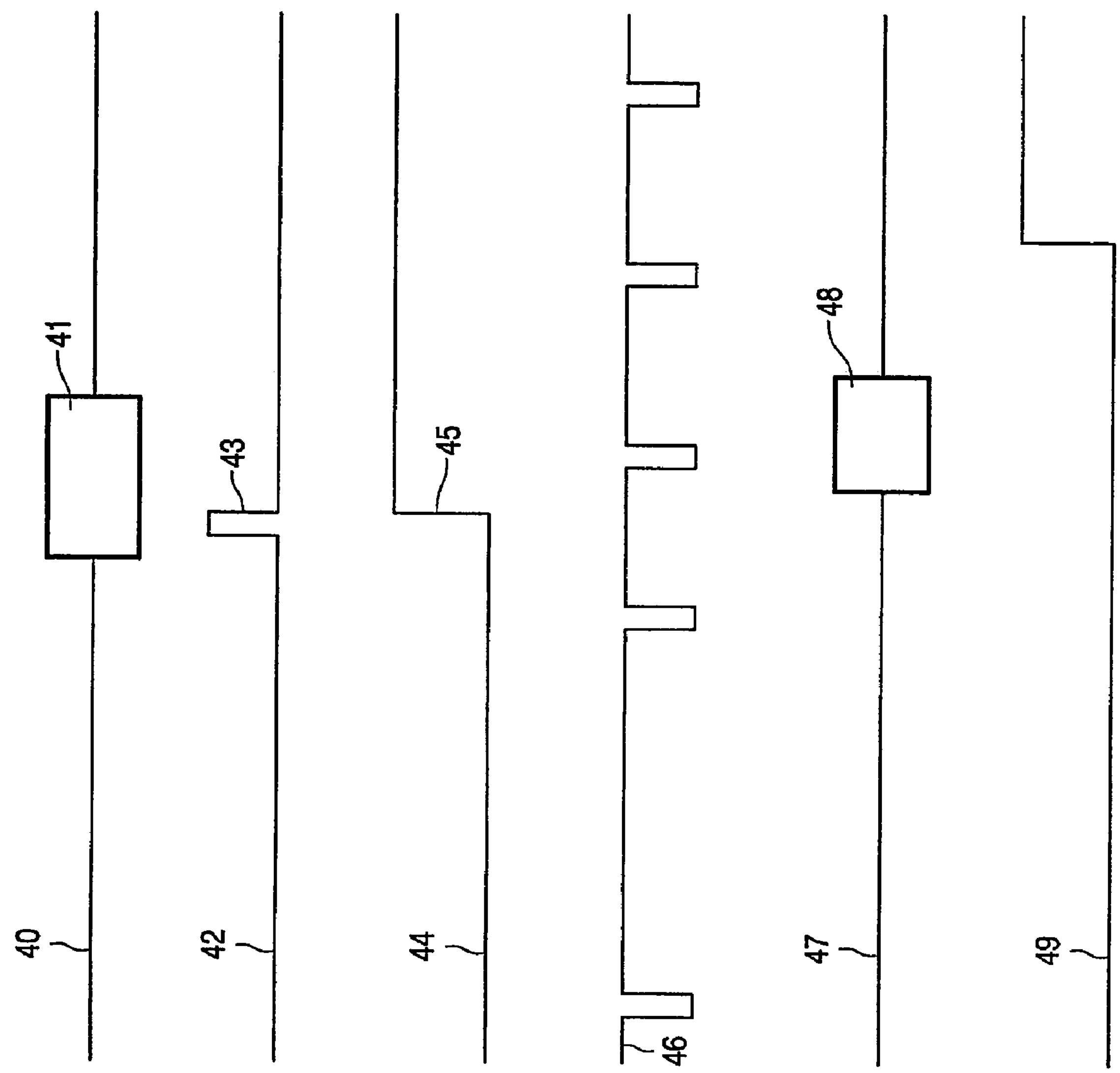
FIG. 4 shows further signals used in a relay circuit.

FIG. 4 shows signals involved in the switch-over to the normal mode. A first signal 40 shows a message 41 arriving at one of the input/outputs 32*a-d*. A second signal 42 shows a trigger pulse 43 generated by one of the detection circuits 34*a-d* in response to the message 41. A third signal 44 is a control signal that the mode control circuit 36 supplies to the first switch 37*a* (which controls power supply to the transceiver 38) and to the power supply 30 in response to the trigger pulse. This third signal 44 makes a transition 45 in response to the trigger pulse.

The power supply 30 regulates the voltage at its output 308. For this purpose the regulator circuit 302 periodically makes the switch 304 conductive for a short time interval. The regulator circuit 302 regulates, for example, the length of this time interval so as to keep the voltage across the charge-up capacitor 306 on average equal to a desired voltage. The frequency of the period with which the regulator circuit 302 makes the switch conductive is much lower in the sleep mode than in the normal mode. In the normal mode the frequency is, for example, 100 kHz, whereas the frequency may be as low as 10 Hz in the sleep mode. Such a low frequency is possible because the relay circuit consumes only a small amount of power in the sleep mode.

After the transition 45 in the third signal 44, the regulator circuit 302 switches from the low frequency used in the sleep mode to the higher frequency used in the normal mode in order to support the higher power consumption in the normal mode. A fourth signal 46 shows control pulses for the switch 304. The distance between the pulses before the transition 45 is much smaller than their distance after the transition 45. Moreover, before as well as after the transition 35 the distance is generally larger than the length of a message 41. The distance is not drawn to scale, but merely illustrates the principle of different distances between pulses.

The switch to a much higher frequency of operation requires the regulator circuit 302 to activate a feedback loop that is capable of regulating the output voltage of the power supply with a much higher regulating speed than in the sleep mode. It takes some time before the feedback loop reaches a stable state, that is usually the time needed for a number of pulses to the switch 304.

The transceiver 38 starts to receive power supply when the power supply 30 receives the signal to increase its operation frequency. A sixth signal 47 shows the remainder 48 of the message 41 that is relayed by the transceiver. It should be noted that transmission of the remainder starts before the power supply 30 has been able to respond to the switch back to the normal mode. Thus, the transceiver 38 uses charge that was loaded into the charge-up capacitor 306 during operation in the sleep mode so as to transmit as much of the remainder 48 of the message 41 as possible.

The further circuits 39 and the second switch are optional, depending on whether such further circuits 39 have been included and whether these further circuits are fed by the power supply. A seventh signal 49 shows a control signal from the mode control circuit 36 to the second switch 37*b* for supplying the further circuits 39. The seventh signal 49 enables power supply to these circuits only once the power supply 30 has started operating normally. Up to that time the mode control circuit 36 sends a reset signal to the further circuits 39 so as to keep these circuits in a reset state and to make these further circuits 39 start operating from a defined state once normal power supply is available. It should be noted that the transceiver 38 does not receive such a reset signal and can, therefore, relay the remainder 48 of the message 41 even though the power supply 30 is not yet operating normally and a significant part of the message 41 has already passed.

It will be appreciated that many alternatives to the embodiment shown in FIG. 3 are possible without deviating from the invention. For example, the further circuits 39 may be omitted if they are not needed and/or a part of the transceiver 38 that is not necessary for transmitting the remainder 48 of the message 41 may start to receive power only when the power supply circuit 30 is ready or may receive a reset signal until the power supply circuit 30 is ready. Instead of using the switches 37*a,b* in the power supply connection to the transceiver 38 and the further circuits, switches at various places inside these circuits may be used to reduce the power consumption of these circuits.

Another type of power supply circuit 30 may be used, for as long as the power supply circuit has the capability of providing supply current quickly when the mode control circuit switches back to the normal mode. When a charge-up capacitor is used, another type of power supply circuit with a charge-up capacitor may be used, for example, a circuit with a permanent current from the input 300 to the charge-up capacitor, possibly using a small transistor (not shown) in parallel with the switch 304 to conduct this current in the sleep mode, while keeping the switch 304 non-conductive.

Other communication lines, such as optic fibers, may be used instead of conductor lines to and from the input/outputs of the transceivers 38. Detection of messages may be performed in a way other than by comparison of a difference signal with a threshold.

Figure 5:
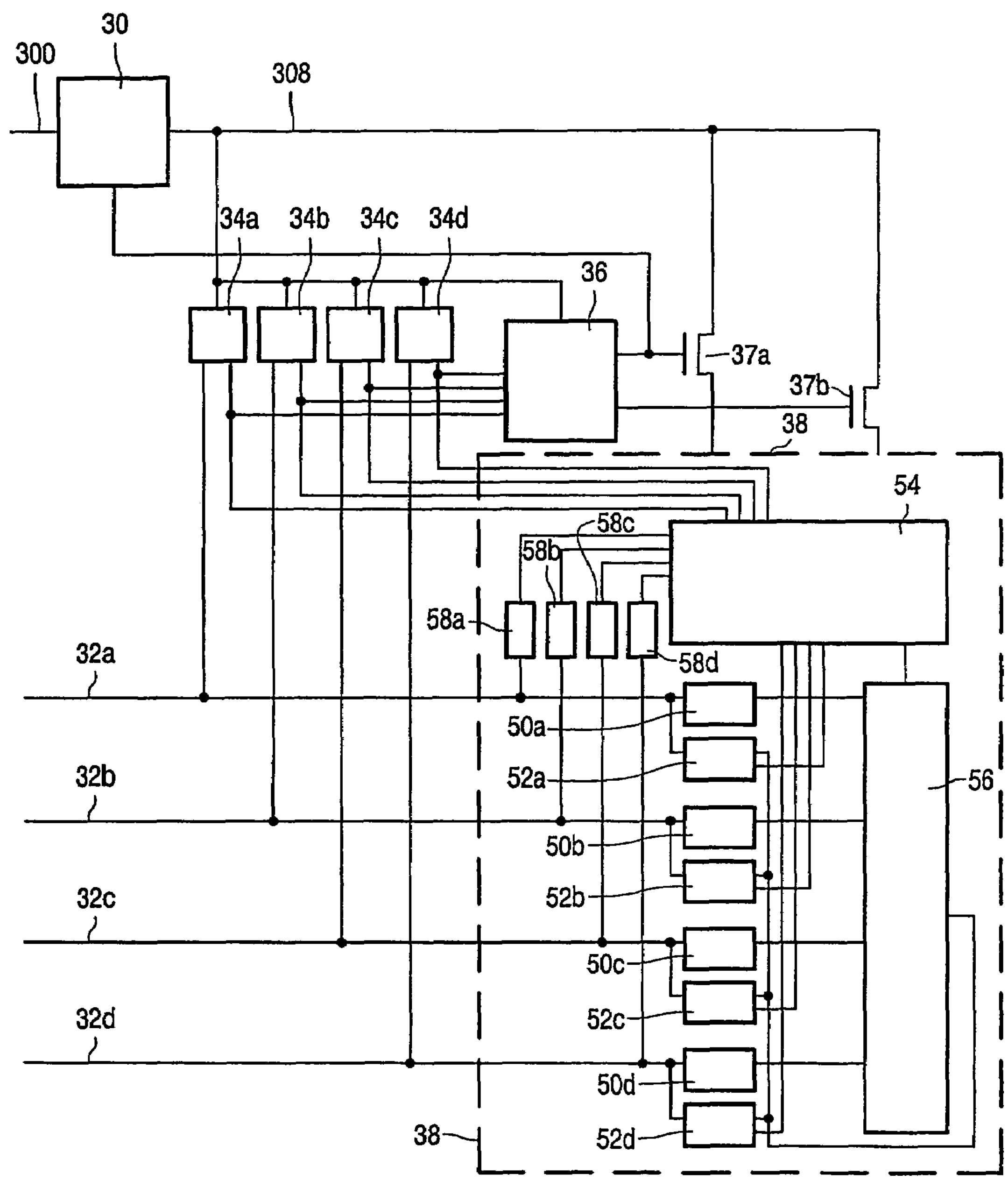
FIG. 5 shows a further relay circuit.

FIG. 5 shows a further embodiment of the relay circuit. In addition to the components shown in FIG. 4, this figure shows receiver circuits 50*a-d* and transmitter circuits 52*a-d*, a configuration circuit 54, a multiplexer 56 and further detectors 58*a-d*. The receiver circuits 50*a-d* have inputs coupled to respective input/outputs 32*a-d*, and outputs coupled to the multiplexer 56. The transmitter circuits have inputs coupled to an output of the multiplexer 56 and outputs coupled to respective input/outputs. The further detectors 58*a-d* have inputs coupled to the input/outputs. Both the detection circuits 34*a-d* and the further detectors have outputs coupled to the configuration circuit. The configuration circuit 54 has a mode control input coupled to the mode control circuit 36.

The configuration circuit 54 has outputs coupled to enable inputs of the transmitter circuits 52*a-d* and to a control input of the multiplexer 56.

In the normal mode of operation, the configuration circuit 54 controls the direction of the transfer between the input/outputs 32*a-b*. When one of the further detector circuits 58*a-d* detects the start of a message on its input/output 32*a-d*, it signals this start to the configuration circuit 54. The configuration circuit 54 then switches to a configuration for input from this input/output 32*a-d*. In this configuration, the configuration circuit 54 enables the transmitters 52*a-d* to the other input/outputs (keeping disabled the transmitter coupled to the input/output 32*a-d* where a message has started) and commands the multiplexer 56 to pass the message from the receiver 50*a-d* that receives the message to the transmitters 52*a-d*. The configuration circuit 54 maintains this configuration as long as a message is in progress.

Further detectors 58*a-d* do not receive power in the sleep mode. On transition from the sleep mode to the normal mode, the configuration circuit 54 enters a state in which it selects the configuration in dependence on signals from the detection circuits 34*a-d* that operate in the sleep mode. Subsequent detection signals from further detectors 58*a-d* are ignored until the message has finished. Thus, no time is lost in waiting for the further detectors 58*a-d* to power up and there is no risk of errors arising during power up of these further detectors 58*a-d*. Preferably, power supply to the further detectors 58*a-d* is switched on only when the further circuits 39 are powered up, thus reducing power consumption from the charge-up capacitor 306 at the beginning of operation in the normal mode.

In another embodiment (not shown) further detectors 58*a-d* have their input connected to outputs of receivers 50*a-d* instead of the inputs as shown in FIG. 5. Thus, the further detectors need not amplify or filter the signals (since this is done by the receivers 50*a-d*). This is realized without causing a delay due to the switch-on delay of the receivers upon switching from the sleep mode to the normal mode, because the detection circuits 34 control the configuration after that transition.

A time-slot multiplexing protocol may be used to assign time slots to the node circuits 10*a-f* in which they have the right to transmit messages. In that case the configuration circuit 54 may select the configuration independence on time, rather than on detection by further detectors 58*a-d*, or independence on such detection only. For example, the configuration circuit may be arranged to count the number of time slots after receiving a synchronization signal and to use the counted number to select the configuration, possibly disabling the transmitters 52*a-d* when the detectors 58*a-b* detect no message in the relevant time slot. In this case, on switch-over from the sleep mode to the normal mode, selection of the configuration nevertheless is preferably determined initially by the detection circuits 34*a-d*, independently of the time slot. Thus, the configuration circuit 54 does not need to count time slots in the sleep mode nor does it need to handle a synchronization signal before it can enable the transmitters 52*a-d* to transmit the remainder 48 of the message 41.

It will be understood that many alternatives are possible in respect of FIG. 5. For example, the function of the multiplexer 56 may be realized by including a tri-state driver, open collector circuit or open drain circuit at the output of each of the receivers 50*a-d*. In that case the outputs of this tri-state driver or open drain/collector circuit may be cross-connected to the outputs of the receivers 50*a-d* and the inputs of the transmitters 52*a-d*, that is, if the configuration circuit 54 has outputs for enabling one of the receivers 50*a-d* independence on whether a message has been detected at the input of that receiver 50*a-d*.

Generally speaking, that is, not limited to the embodiments of FIGS. 4 and 5, at any point where delays may occur due to the need to power-up and/or initialize circuits after a switch from the sleep mode to the normal mode steps may be taken to reduce such delays. In the examples this was done by selectively dispensing with waiting periods, such as a waiting period before the power supply is operating normally, or by using substitute circuits (such as the detectors) to perform functions needed before starting the transmission of the remainder of the message before entering the normal mode.

Moreover, a local message source could be added to the relay circuit. No detector is needed for detecting messages from this message source and, since the relay circuit has to leave the sleep mode to send a message from such a message source, the steps needed to ensure transmission of as much of the remainder as possible may be omitted for this internal message source.

The invention claimed is:

1. A relay circuit for use in a communication bus system including a plurality of node circuits, the relay circuit coupling the node circuits and being operable in a sleep mode and a normal mode, the relay circuit comprising:

a transceiver circuit for relaying messages between the node circuits in the normal mode, the transceiver circuit including a transmitter and a receiver which are both powered down in the sleep mode and powered up in the normal mode;

a detector circuit for detecting an incoming message at least when the relay circuit is in the sleep mode;

a mode control circuit arranged to power up the transceiver in response to detection of an incoming message by the detector circuit, wherein the mode control circuit is arranged to cause the transceiver to relay a remainder of the incoming message after power up;

a power supply circuit with a charge-up capacitor, the power supply circuit being operable in at least a sleep mode and a normal mode, the power supply circuit being arranged to charge-up the charge-up capacitor in the sleep mode at a lower rate than in the normal mode under control of the mode control circuit;

the detector receiving power from the charge-up capacitor in the sleep mode;

the transceiver circuit being coupled to the charge-up capacitor, the transceiver circuit comprising an interrupter circuit for interrupting power consumption from the power supply circuit by the transceiver;

the mode control circuit being arranged to lift said interruption upon said detection of the incoming message, the mode control circuit causing the transceiver circuit to start relaying the remaining part of the incoming message in advance of a time at which the power supply circuit starts providing a higher recharge rate during switch-over from the sleep mode to the normal mode.

2. A relay circuit according to claim 1, further arranged to disable power consumption from the power supply circuit by a further circuit in the relay circuit, excluding the transceiver, in the sleep mode until the power supply circuit has started providing the higher recharge rate after the switch-over from the sleep mode to the normal mode.

3. A communication bus system comprising a plurality of node circuits and a relay circuit coupling the node circuits, the relay circuit being operable in a sleep mode and a normal mode, wherein the relay circuit comprises:

a transceiver circuit for relaying messages between the node circuits in the normal mode, the transceiver circuit including a transmitter and a receiver which are both powered down in the sleep mode and powered up in the normal mode;

a detector circuit for detecting an incoming message at least when the relay circuit is in the sleep mode;

a mode control circuit arranged to power up the transceiver in response to detection of an incoming message by the detector circuit, wherein the mode control circuit is arranged to cause the transceiver to relay a remainder of the incoming message after power up;

a power supply circuit with a charge-up capacitor, the power supply circuit being operable in at least a sleep mode and a normal mode, the power supply circuit being arranged to charge-up the charge-up capacitor in the sleep mode at a lower rate than in the normal mode under control of the mode control circuit;

the detector receiving power from the charge-up capacitor in the sleep mode;

the transceiver circuit being coupled to the charge-up capacitor, the transceiver circuit comprising an interrupter circuit for interrupting power consumption from the power supply circuit by the transceiver;

the mode control circuit being arranged to lift said interruption upon said detection of the incoming message, the mode control circuit causing the transceiver circuit to start relaying the remaining part of the incoming message in advance of a time at which the power supply circuit starts providing a higher recharge rated during switch-over from the sleep mode to the normal mode.

4. A communication bus system according to claim 3, the mode control circuit being arranged to disable power consumption from the power supply circuit by a further circuit in the relay circuit, excluding the transceiver, in the sleep mode until the power supply circuit has started providing the higher recharge rate after the switch-over from the sleep mode to the normal mode.

5. A communication bus system according to claim 3, wherein the node circuits transmit messages in assigned time slots according to a time-slot multiplexing protocol.

6. A communication bus system according to claim 3, wherein the mode control circuit is arranged to power down the relay circuit in response to receiving no messages during a predetermined time interval.

7. A communication bus system according to claim 3, wherein each of the relay circuit components, other than the charge-up capacitor and an inductor of the power supply circuit, are included in a single integrated circuit chip.

8. A communication bus system according to claim 3, wherein the power supply circuit includes a regulator circuit for regulating a voltage across the charge-up capacitor by controlling a switching frequency of the power supply circuit in dependence on the voltage across the charge-up capacitor.

9. A communication bus system according to claim 8, wherein the switching frequency is about 100 kHz during normal mode and the switching frequency is about 10 Hz during sleep mode.

10. A communication bus system comprising a plurality of node circuits and a relay circuit coupling the node circuits, the relay circuit being operable in a sleep mode and a normal mode, wherein the relay circuit comprises:

a transceiver circuit for relaying messages between the node circuits in the normal mode, the transceiver circuit including a transmitter and a receiver which are both powered down in the sleep mode and powered up in the normal mode;

a detector circuit for detecting an incoming message at least when the relay circuit is in the sleep mode;

a mode control circuit arranged to power up the transceiver in response to detection of an incoming message by the detector circuit wherein the mode control circuit is arranged to cause the transceiver to relay a remainder of the incoming message after power up;

a plurality of inputs and outputs for messages;

a configuration circuit for configuring a direction of relay operation of the transceiver circuit from one of the inputs towards at least one of the outputs;

the detection circuit being coupled to the configuration circuit for configuring the direction in which the remainder of the incoming message is relayed in dependence on detection of which one of the inputs the detection circuit detected said message in the sleep mode;

a further detection circuit for detecting from which one of the inputs a message arrives during the normal mode and for controlling the configuration circuit to configure said direction according to said one of the inputs in the normal mode for at least one further message subsequent to said incoming message, the further detection circuit providing faster detection than the detection circuit and being powered down in the sleep mode.

11. A communication bus system comprising a plurality of node circuits and a relay circuit coupling the node circuits, the relay circuit being operable in a sleep mode and a normal mode, wherein the relay circuit comprises:

a transceiver circuit for relaying messages between the node circuits in the normal mode, the transceiver circuit including a transmitter and a receiver which are both powered down in the sleep mode and powered up in the normal mode;

a detector circuit for detecting an incoming message at least when the relay circuit is in the sleep mode;

a mode control circuit arranged to power up the transceiver in response to detection of an incoming message by the detector circuit wherein the mode control circuit is arranged to cause the transceiver to relay a remainder of the incoming message after power up;

a plurality of inputs and outputs for messages;

a configuration circuit for configuring a direction of relay operation of the transceiver circuit from one of the inputs towards at least one of the outputs;

the detection circuit being coupled to the configuration circuit for configuring the direction in which the remainder of the incoming message is relayed in dependence on detection of which one of the inputs the detection circuit detected said message in the sleep mode;

the bus system being operable according to a time-slot multiplexing protocol, the relay circuit comprising a time-slot selection unit that maintains assignments of time-slots to the inputs in order to control the configuration circuit to enable relay messages from each particular input in time-slots assigned to that particular input, wherein said enabling is taken over by the detection circuit during switch-over from the sleep mode to the normal mode.

* * * * *